United States Patent [19]

Hilsum et al.

[11] Patent Number: 4,460,247
[45] Date of Patent: Jul. 17, 1984

[54] TEMPERATURE COMPENSATED LIQUID CRYSTAL DISPLAYS

[75] Inventors: Cyril Hilsum; Edward P. Raynes, both of Malvern, England

[73] Assignee: The Secretary of State for Defence in Her Britannic Majesty's Government of the United Kingdom of Great Britain and Northern Ireland, London, England

[21] Appl. No.: 971,240

[22] Filed: Dec. 20, 1978

[30] Foreign Application Priority Data

Dec. 20, 1977 [GB] United Kingdom ............... 53041/77
Apr. 12, 1978 [GB] United Kingdom ............. 144241/78

[51] Int. Cl.³ ............................................... G02F 1/13
[52] U.S. Cl. ................................. 350/331 T; 350/336; 350/337
[58] Field of Search .............................. 350/331, 336

[56] References Cited

U.S. PATENT DOCUMENTS 3,705,310 12/1972 Wild .................... 350/336 X
3,921,162 11/1975 Fukai et al. ............. 350/331 X
4,128,311 12/1978 Smith et al. ............. 350/336 X

*Primary Examiner*—John K. Corbin
*Assistant Examiner*—R. Gallivan
*Attorney, Agent, or Firm*—Stevens, Davis, Miller & Mosher

[57] ABSTRACT

A liquid crystal display comprises two transparent slides containing a thin layer of liquid crystal material which may be nematic or cholesteric. Addressing electrode structures on the inner faces of the slide allow voltages to be applied across the layer to cause an observable display effect. The voltage at which an observable display occurs is temperature dependent. Sensing electrodes are connected in series with a reference impedance ($Z_f$). With a constant supply voltage ($V_o$) across the sensing electrodes and reference impedance ($Z_f$) the voltage ($V_{LC}$) variation is used to control the voltages applied to the addressing electrode to compensate for temperature variations in the layer.

10 Claims, 8 Drawing Figures

TEMPERATURE COMPENSATED LIQUID CRYSTAL DISPLAYS

This invention relates to liquid crystal displays and concerns the compensation of electrical characteristics with temperature.

Liquid crystal displays are commonly formed by enclosing a thin, typically 12 μm thick, layer of liquid crystal material between two glass slides. Electrodes on the slides inner face enable a voltage to be applied across the liquid crystal layer.

Application of a voltage above a threshold value causes a change in the molecular alignment of the liquid crystal molecules i.e. to an on 'ON' state. On removing the voltage the molecules relax back to their 'OFF' state.

This voltage controlled molecular alignment is used in various types of liquid crystal displays, e.g. twisted nematic, and phase change effect displays. To display numerics, symbols, or waveform parts of the layer are caused to be ON whilst other parts are OFF. This is achieved by shaping the electrodes into e.g. 7 bar displays, or e.g. arranging the electrodes as row or column strip electrodes on the two slides to form an x, y matrix or radial and curved, strip electrodes to form a polar co-ordinate $(r-\theta)$ display.

An x, y or r, $\theta$ matrix array or seven bar display arranged in a matrix format may be addressed in a multiplexed manner, e.g. apply voltages to the whole display a line at a time. If the scan time is much shorter than the natural response time of the liquid crystal the display appears constant (no flicker).

The threshold voltage of a liquid crystal material, for a given layer thickness, varies with temperature and limits the complexity of multiplexed displays.

One way of overcoming this problem of threshold voltage variation is to maintain the liquid crystal layer at a uniform temperature using sensors and heaters.

According to this invention a method of compensating for theshold voltage variation with liquid crystal temperature of a liquid crystal display cell comprises the steps of applying a voltage between a critical value and a saturation value to at least a part of a liquid crystal layer, monitoring the capacitance of that part of the layer and using capacitance changes with temperature to control voltage levels applied to the cell.

According to this invention apparatus for carrying out the above includes a liquid crystal cell comprising two spaced slides, at least one of which is transparent, having on their facing surfaces electrode structures, a layer of a liquid crystal material contained between the slides and further includes means for applying across at least a portion of the layer and a reference impedance arranged in series, a voltage, and means for using the voltage developed across the portion of layer to control the voltage level applied to the remainder or display portion of the cell.

The reference impedance may be adjustable and may be resistive, inductive, capacitive or any suitable combination thereof.

The means for using the voltage developed across the portion of the layer may include an amplifier which adds or subtracts a control voltage from a supply voltage applicable to the display portion of the cell.

In large displays, e.g. matrix addressed displays, the capacitance may be monitored at different parts of the layer independently and used to compensate voltage applied to different parts of the layer. Alternatively the several values of capacitance may be averaged.

The liquid crystal material may be nematic or a long pitch cholesteric so the display operates as a twisted nematic display, or the material may be a cholesteric material so the display operates as a phase change display.

The invention will now be described, by way of example only, with reference to the accompanying drawings of which:

Figure 1:
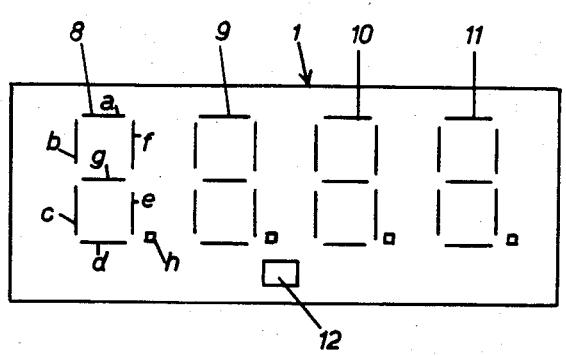
FIG. 1 is a front view of a four digit numeric display.
Figure 2:
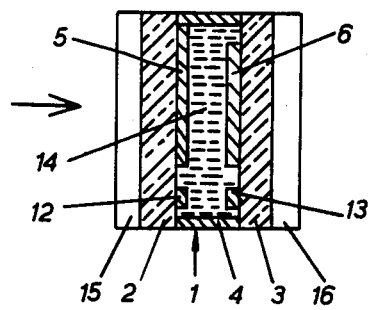
FIG. 2 is a cross sectional view of FIG. 1.

The display of FIGS. 1, 2 comprise a liquid crystal cell 1 having two glass slides 2, 3 spaced 12 μm apart by a spacer 4. The inner faces of the slides 2, 3 carry electrode patterns 5, 6 collectively forming four seven bar plus decimal point characters 8, 9, 10, 11. Each numeric number 8 to 11 is arranged to be addressed in a multiplexed manner. The eight parts of each character and point are referenced a to h. On the front slide 2 elements are interconnected in three groups e.g. a and b; c, g and f; d, e and h; whilst on the rear slide 3 elements are interconnected in three groups a, f, and h; b, g and e; c and d. Thus each character 8 to 11 can be considered as a 3×3 matrix and the four characters collectively as a three line by twelve column matrix.

The two small sensing electrodes 12, 13 are arranged, one on each slides 2, 3 facing one another to form part of a temperature sensing circuit.

Between the slides 2, 3 is a layer of liquid crystal material 14 having a positive dielectric anisotropy and may be nematic or a nematic doped with an optically active material such as d-menthol or about 0.2% of cholesterol nonanoate. One suitable material is E7 having the following composition:

| | |
|---|---|
| $C_5H_{11}$—⟨O⟩—⟨O⟩—CN | 51% by weight |
| $C_7H_{15}$—⟨O⟩—⟨O⟩—CN | 25% by weight |
| $C_8H_{17}O$—⟨O⟩—⟨O⟩—CN | 16% by weight |
| $C_5H_{11}$—⟨O⟩—⟨O⟩—⟨O⟩—CN | 8% by weight. |

Prior to assembly the inner face of both slides 2, 7 are treated to provide a surface alignment e.g. unidirectional rubbing or oblique evaporation of silicon monoxide as described in U.K. Patent Specifications Nos. 1,472,247 and 1,478,592. The slides are assembled with the alignment (e.g. rubbing directions) orthogonal so that the liquid crystal molecules in the layer 14 progressively twist through 90° across the layer thickness. The layer is thus optically active and rotates the plane of plane polarised light through 90°.

A polariser 15 and an analyser 16 are arranged either side of the cell 1 with their polarisation axis parallel to one another and to one alignment direction.

In operation with zero voltage applied across the layer 14 no light is transmitted through the display. When a suitable voltage is applied across the layer 14 its molecules rotate to lie parallel with the applied electric field. In this condition the liquid crystal layer no longer rotates the plane of polarised light and so passes through the display.

Figure 4:
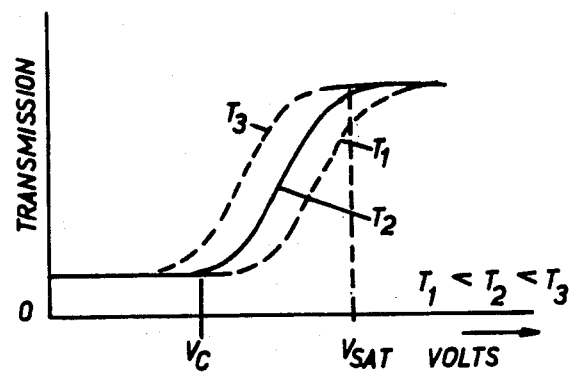
FIGS. 4, 5, 6, 7 and 8 are graphs showing characteristics of the display of FIGS. 1 and 2.
Figure 5:
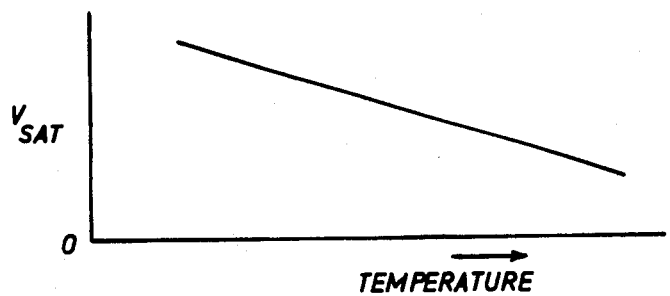

The manner in which light passing through the display varies with applied voltage is shown in FIG. 4. If crossed polarisers were used the transmission curve would be inverted with maximum transmission at zero voltage. From FIG. 4 it can be seen that a critical voltage $V_c$ typically about 1 volt is required before any change in transmission occurs, and at a saturation voltage $V_{sat}$ typically 2 volts about 90% transmission occurs. The values of $V_c$ and $V_{sat}$ vary with temperature as shown in FIG. 5. Since multiplexed displays operate with voltages close to $V_c$ it is necessary to limit the temperature range of operation, for a given liquid crystal, or compensate for this variation of $V_c$ and $V_{sat}$.

Figure 3:
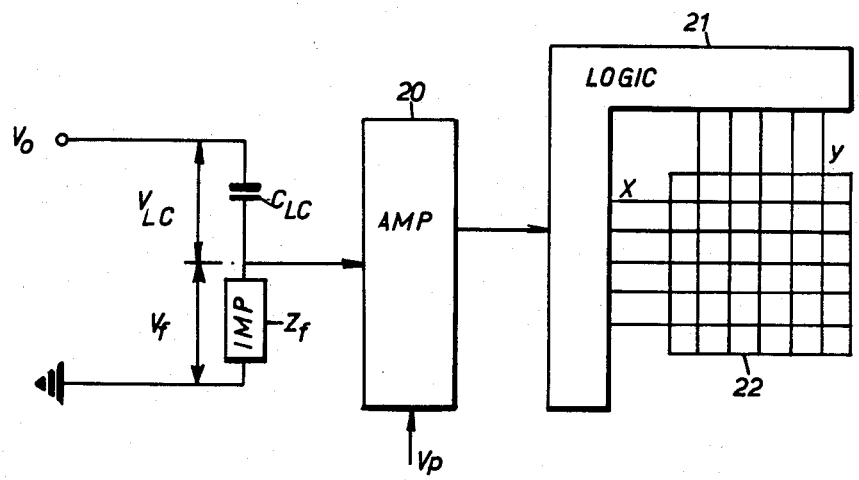
FIG. 3 is a schematic view of an x, y matrix display having a temperature compensated voltage supply.

The volume of liquid crystal between electrodes forms a high impedance capacitor. FIG. 3 shows an equivalent circuit with a 10 KHz sinewave voltage source $V_o$ connected across a capacitor $C_{LC}$, and an impedance $Z_f$. The voltage $V_{LC}$ across $C_{LC}$ is fed into a buffer amplifier 20 and thence into control logic 21 for an x, y matrix display 22. A pedestal voltage $V_p$ is also fed into the amplifier 20 from a voltage source. The capacitor $C_{LC}$ is formed by the liquid crystal 14 between the sensing electrodes 12, 13, and is typically about 600 pF for a one square cm area when the material is OFF and about 1800 pF when the material is ON.

Figure 6:
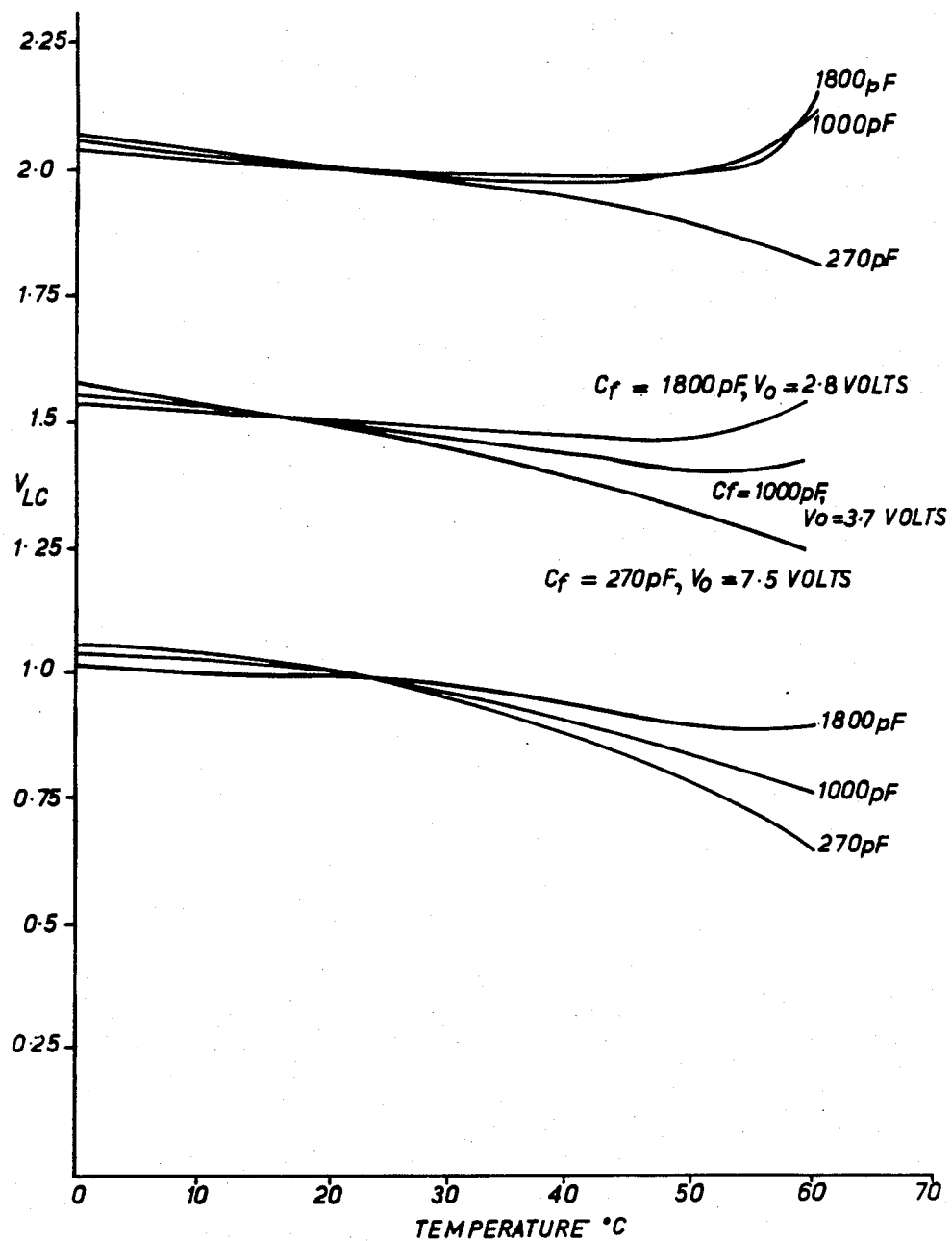

FIG. 6 shows how $V_{LC}$ changes with temperature for a number of values of $Z_f$. Three values of $Z_f$ were chosen 270 pF, 1,000 pF, and 1800 pF and for each value of $Z_f$ $V_o$(at 10 kHz sine wave) was adjusted to give a $V_{LC}$ of 1.0, 1.5 and, 2.1 volts r.m.s. at about 20° C. When $V_{LC}$ was about 1.5 volts at 20° C. the values of $V_o$ for $Z_f=270$ pF, 1,000 pF, and 1,800 pF were 7.5, 3.7, and 2.8 volts r.m.s. respectively. For values of $V_{LF}$ about 1.5 volts, at about 20° C., and $Z_f=270$ pF or 1,000 pF the change of $V_{LC}$ is approximately linear over the range 0°–50° and is used to control the gain and hence the voltage output from the amplifier 20 to the control logic 21 and display 22. All voltages are r.m.s. values.

Figure 7:
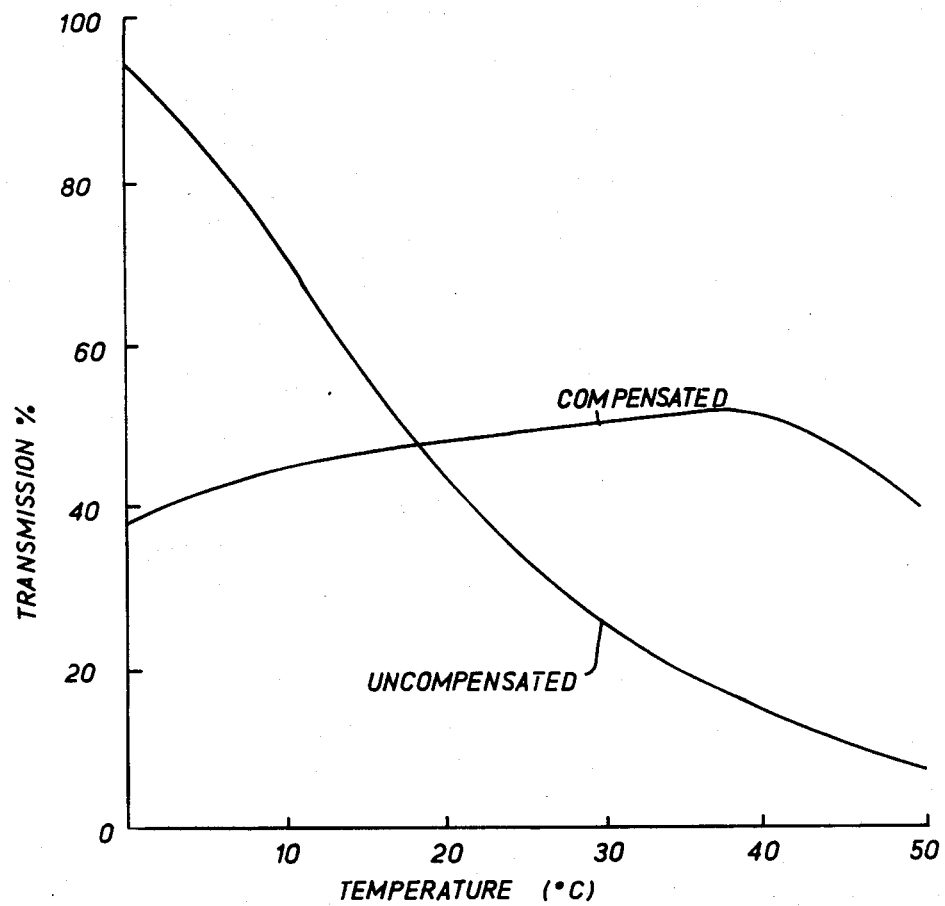

FIG. 7 shows how the transmission of the liquid crystal varies as a function of temperature for the steep part of the transmission curves, FIG. 4, both for the case of a fixed supply voltage (2 volts r.m.s.) with no temperature compensation, and for a temperature compensated voltage. The uncompensated curve varies from 95% transmission at 0° C. to 6% at 50° C. By comparison, with compensation, the transmission varies by only ±5% over the same temperature range.

Figure 8:
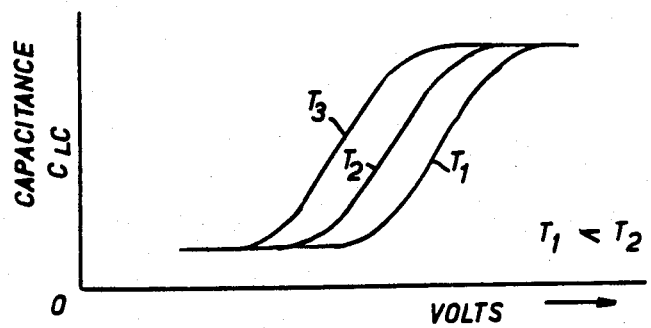

FIG. 8 shows how the capacitance of a liquid crystal layer changes with applied voltage for a number of temperatures.

The matrix display 22 is addressed in a conventional third select manner. For example a voltage of 2V is scanned line by line down the line X electrodes whilst +or −V is connected as appropriate to the column y electrodes as each line receives 2V to give +3V or V at each x y intersection. The r.m.s. value ON elements is arranged to be at or above saturated whilst V is just below threshold voltage.

In a modification the position of $C_{LC}$ and $Z_f$ are reversed.

In a further modification the voltage level between $C_{LC}$ and $Z_f$ is held constant and the value of $V_o$ allowed to float. This floating value of $V_o$ is then fed into the logic 21 at a level suitable for applying to the display.

What I claim is:

1. A method of compensating for threshold voltage variation with liquid crystal temperature of a liquid crystal display cell comprising the steps of applying a voltage between a critical value and a saturation value to at least a part of a liquid crystal layer, monitoring the capacitance of that part of the layer and using capacitance changes with temperature to control voltage levels applied to the cell.

2. A liquid crystal display comprising two spaced slides at least one of which is transparent, a layer of liquid crystal material contained between the slides, means for applying addressing voltage across selected areas of the liquid crystal layer to cause a voltage controlled molecular orientation, means for applying a voltage across a portion of the liquid crystal layer and a reference capacitor arranged in series whereby the voltage across said portion of liquid crystal layer is between a critical and a saturation value, and means for using a voltage $V_{LC}$ developed across said portion of liquid crystal layer to control the addressing voltage level applied to the display; whereby changes of $V_{LC}$ with the temperature of the liquid crystal layer are used to compensate for temperature related changes in the addressing voltage requirements of the display.

3. A display according to claim 2 wherein the means for applying a voltage across a portion of the layer comprises two sensing electrodes arranged as a pair facing one another across said portion of the liquid crystal layer.

4. A display according to claim 2 wherein the means for using changes in $V_{LC}$ comprises an amplifier.

5. A display according to claim 2 wherein the liquid crystal material is a nematic liquid crystal material and wherein the slides are surface treated to provide alignment of the liquid crystal molecules whereby the liquid crystal layer rotates the plane of plane polarized light.

6. A display according to claim 5 wherein the nematic liquid crystal material has added thereto a small amount of an optically active material.

7. A display according to claim 2 wherein the means for supplying addressing voltages comprises electrode structures and means for addressing selected portions of the electrode structures in sequence.

8. In a method for changing molecular alignment of liquid crystal molecules in a liquid crystal display device by application of a voltage across a liquid crystal material above the threshold voltage to produce an observable display, the improved method of compensating for variation in threshold voltage in response to temperature change which comprises the steps of applying a voltage between a critical value and a saturation value across only a portion of a layer of liquid crystal material and a reference impedance arranged in series, and varying the voltage applied to the remainder of the layer in response to capacitance changes with temperature variations.

9. The method of claim 8 wherein voltage applied to the said portion of liquid crystal material is a modified supply voltage.

10. The method of claim 8 wherein the liquid crystal material is nematic or long pitch cholesteric.

* * * * *